(12) United States Patent
Häglsperger et al.

(10) Patent No.: US 7,370,695 B2
(45) Date of Patent: May 13, 2008

(54) COMBINED COOLING/CLIMATE CONTROL SYSTEM FOR MOTOR VEHICLES

(75) Inventors: Simon Häglsperger, Velden (DE); Andreas Kraft, Adlkofen (DE); Florian Prankl, Ohu (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 0 days.

(21) Appl. No.: 11/150,280

(22) Filed: Jun. 13, 2005

(65) Prior Publication Data

US 2006/0016588 A1 Jan. 26, 2006

(30) Foreign Application Priority Data

Jun. 14, 2004 (DE) .................. 10 2004 028 740

(51) Int. Cl.
*B60R 16/02* (2006.01)
*H05K 7/20* (2006.01)
*B60H 1/32* (2006.01)
*B60H 1/00* (2006.01)
*F28F 13/12* (2006.01)

(52) U.S. Cl. .......................... 165/202; 165/42; 165/43; 165/80.3; 165/108; 165/41; 165/244; 62/244; 62/259.2; 361/395; 454/69; 454/148

(58) Field of Classification Search ................ 165/202, 165/42, 43, 80.3, 108, 41, 244; 62/244, 259.2; 361/695; 454/69, 148
See application file for complete search history.

(56) References Cited

U.S. PATENT DOCUMENTS

| 3,896,872 A | * | 7/1975 | Pabst et al. .................. 165/42 |
| 4,319,519 A | * | 3/1982 | Parsson ....................... 454/158 |
| 5,573,383 A | | 11/1996 | Uemura et al. |
| 5,669,813 A | | 9/1997 | Jairazbhoy et al. |
| 5,706,790 A | * | 1/1998 | Kemmler et al. ........... 123/564 |
| 5,979,540 A | | 11/1999 | Allison et al. |
| 6,962,195 B2 | * | 11/2005 | Smith et al. ................. 165/202 |

FOREIGN PATENT DOCUMENTS

| DE | 41 04 034 A1 | | 8/1992 |
| DE | 42 20 669 C1 | | 7/1993 |
| DE | 19853329 A1 | * | 5/2000 |
| FR | 2 742 816 A1 | | 6/1997 |
| GB | 2343164 A | * | 5/2000 |
| JP | 09 156 343 A | | 6/1997 |
| JP | 2001253306 A | * | 9/2001 |

* cited by examiner

*Primary Examiner*—John K. Ford
(74) *Attorney, Agent, or Firm*—Sughrue Mion, PLLC

(57) ABSTRACT

The present invention relates to a combined cooling/climate control system for motor vehicles for cooling the motor vehicle's electrical and/or electronic components and air conditioning of a passenger compartment of the vehicle, comprising: a main ventilation duct (13); a fan (15) for drawing in air disposed in the main ventilation duct; a heating unit (16) downstream of the fan (15) for selective warming of air, which is to be supplied to the passenger compartment; and for cooling the electrical and/or electronic components with air drawn in by the fan (15), an air supply pipe (20) downstream of the fan (15) and upstream of the heating unit (16) connected to the main ventilation duct (13) and an air discharge pipe (22) upstream of the fan (15) connected to the main ventilation duct (13).

7 Claims, 3 Drawing Sheets

US 7,370,695 B2

COMBINED COOLING/CLIMATE CONTROL SYSTEM FOR MOTOR VEHICLES

FIELD OF THE INVENTION

Figure 1:
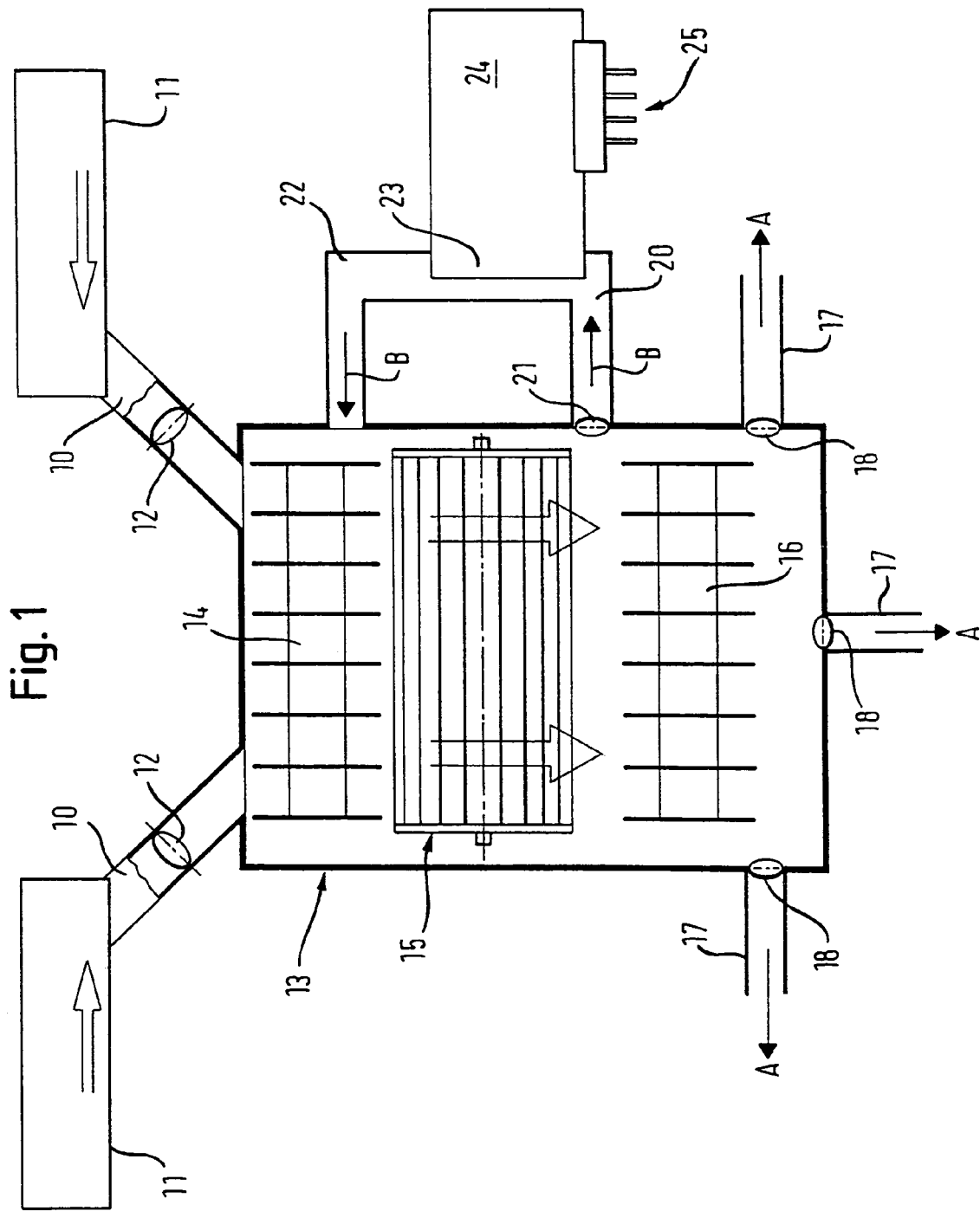

The present invention relates to a combined cooling/climate control system for motor vehicles for cooling the motor vehicle's electrical and/or electronic components and air conditioning a passenger compartment of the vehicle. A climate control system according to the present invention is understood to be both a conventional vehicle heating system with blower and heating unit as well as a vehicle air conditioning system with heating and cooling unit and the invention covers both embodiments.

BACKGROUND OF THE INVENTION

In motor vehicles of the current prior art, electronic and electrical components of the motor vehicle that are especially connected with functional units of the engine compartment are housed in a so-called E-box. Such E-boxes are also generally accommodated in the motor vehicle's engine compartment. The power loss of the electronic and electrical components, such as the control units of the drive motor, the transmission control units, relays, fuses, etc. in the E-box, makes active cooling necessary in order to dissipate the heat arising due to the power loss away from the components and to prevent said components from overheating and being damaged. Up to now a fan has been provided for this purpose in or on the E-box to facilitate removal of the waste heat arising. In this case the cooling air is drawn in from the passenger footwell and the heated air is blown back into the same space. However, this embodiment of the prior art has several problems. First of all, the cooling potential is low because the intake and outlet orifices of the E-box are situated very close together. An acoustic exposure is exerted in the passenger compartment due to the connection between the motor vehicle's interior or passenger compartment and the E-box. This acoustic exposure is generated by the E-box's fan, as well as tire and engine noises which are transmitted to the passenger compartment via the E-box. Furthermore, there is an additional problem in that uncleaned cooling air, i.e. cooling air possibly loaded with dust, is drawn in from the footwell and the fan can become dirty and possibly damage the electrical components. Moreover, in the embodiment of the prior art, it is not possible to achieve any further increase in the cooling performance.

In motor vehicles there is also an increased need to cool electronic and electrical components such as control units, relays or fuses, for example, which are connected to functional units of the interior or passenger compartment, and correspondingly to dissipate the heat. These electrical and electronic components are usually installed behind the dashboard of a motor vehicle in an apparatus rack. The apparatus rack takes up a substantial amount of space behind the instrument panel or dashboard and thus also influences its design. To achieve appropriate cooling of these components, DE 697 07 663 T2, for example, disposes the electrical and electronic components in a sort of "bypass" to an existing main ventilation duct of a vehicle's climate control system. However, the "bypass" is disposed downstream of the fan and dissipates air admitted through the main ventilation duct downstream of the fan and returns said air back to the main ventilation duct downstream of the fan after cooling the components. This design causes substantial interference in the mode of operation of the vehicle's climate control system, whether it is a heating system with conventional blower or an air conditioning unit, thereby impairing their mode of operation. In addition, DE 697 07 663 T2 proposes disposing the electronics on an auxiliary ventilation duct so that cooling of heat loss producers is only possible in the dashboard, as a result of which the apparatus rack similarly requires more space in the dashboard. Furthermore, the blower in DE 697 07 663 T2 blows into the interior of the dashboard when the fan is in the 'off' position thus causing flow and fan noises as well as dragging in acoustic noise from the engine compartment.

SUMMARY OF THE INVENTION

Thus the present invention is based on the technical problem of providing a combined cooling/climate control system for motor vehicles for cooling the motor vehicle's electrical and/or electronic components and air conditioning a passenger compartment of the motor vehicle, in which appropriate cooling of the motor vehicle's electrical and/or electronic components is achieved without interfering noticeably in the motor vehicle's climate control system for a passenger in the motor vehicle's passenger compartment, whether said system is a conventional heating system with blower or an air conditioning system.

These and other functions and benefits are achieved by means of a combined cooling/climate control system for motor vehicles with the characteristics of patent claim 1. Further advantageous embodiments and developments of the present invention are defined in the dependant claims.

Thus the present invention is based on the idea of using the existing climate control system in a motor vehicle, in the form of a heating system with blower or an air conditioning system, to cool the motor vehicle's electrical and/or electronic components wherein almost complete compensation for the interference in the climate control system is achieved by recirculating the cooling air into the intake system of the climate control system's fan. In other words, it is possible to facilitate symmetrical tapping of air from the climate control system as cooling air without substantially and noticeably disrupting the symmetry of said climate control system.

Thus a combined cooling/climate control system for motor vehicles for cooling the motor vehicle's electrical and/or electronic components and air conditioning a passenger compartment of the motor vehicle includes a main ventilation duct, a fan for drawing in air disposed in the main ventilation duct, a heating unit downstream of the fan for selective heating of air that is to be supplied to the passenger compartment and, for cooling the electrical and/or electronic components with air drawn in by the fan, an air supply pipe disposed downstream of the fan and upstream of the heating unit connected to the main ventilation duct, and an air discharge pipe upstream of the fan connected to the main ventilation duct. In other words, air is removed as cooling air from the motor vehicle's main ventilation duct downstream of the fan and upstream of the heating unit, routed directly or indirectly to or past the electrical and/or electronic components and subsequently returned to the motor vehicle's main ventilation duct upstream of the fan, whereby the heat generated by the power loss of the electrical and/or electronic components is dissipated by the cooling air. As a result of this development, the present invention has its own "main air duct" for cooling of the electrical and/or electronic components. Furthermore, by recirculating the cooling air into the fan's intake system, i.e. into the motor vehicle's main ventilation duct upstream of the fan, this means that interference in the motor vehicle's climate control system is compensated by dissipating the cooling air. This makes it possible, by appropriately controlling the fan and interior air vents, which connect the auxiliary ventilation ducts linked to the main ventilation duct with the passenger compartment, to compensate interference in the existing climate control system by diverting air from the main ventilation duct for cooling the electrical and/or electronic components in such a way that said interference is undetectable for a passenger in the motor vehicle. In addition, due to the embodiment according to the invention, there is always a pressure difference available which facilitates a throughflow of air from the air supply pipe to the air discharge pipe. Furthermore, the recirculated air is mixed with fresh, cold air upstream of the fan which provides additional compensation for interference in the climate control system. Moreover, this embodiment provides a very flexible system since the arrangement of the electrical and/or electronic components can be provided in more or less any position in the motor vehicle and the cooling air can be dissipated from or supplied to the appropriate positions of the main ventilation duct by way of the air supply line and air discharge line respectively.

In an advantageous manner, in the combined cooling/climate control system of the present invention, the electrical and/or electronic components are disposed in a closed housing with a heat exchanger. To cool the electrical and/or electronic components in the housing, the heat exchanger is provided in a duct which is created from the air supply and air discharge pipe so that the heat lost by the electrical and/or electronic components can be dissipated by way of the heat exchanger. In this embodiment the heat exchanger may have several ribs provided on the housing. The heat exchanger may also be replaced by a Peltier element. In addition, the embodiment makes it possible to use a multi-control unit in the closed housing, which takes over the functions of several electrical and/or electronic components that are connected to functional units of the vehicle's interior or passenger compartment, so that it is possible to dispense with the apparatus rack behind the dashboard, i.e. on the passenger side in the motor vehicle's "interior", resulting in a gain in construction space in the interior of the vehicle. Furthermore, there is a large cooling potential for cooling the electrical and/or electronic components.

In an advantageous manner, the control units of the motor vehicle's drive system and/or the control units for other functional units of the motor vehicle are accommodated in the closed housing. Amongst the control units of the motor vehicle's drive system, the motor control unit is especially important as it has a large power loss and is thus linked to a high level of heat generation. Therefore, the present invention proposes in this embodiment to take the drive control units, which are conventionally disposed in the E-box, especially the motor control unit, out of the E-box and to house them alone or together with other control units of the drive system and other functional units in the closed housing, and to dissipate the heat arising by means of the cooling/climate control system according to the invention. In this case the fan provided by reference to the prior art on the E-box may also possibly be dispensed with and may especially be dispensed with if all electrical and/or electronic components with high power loss are accommodated in the closed housing according to the present invention. The components remaining in the E-box then no longer require a separate cooling system due to the substantially lower power loss. Thus as a result of moving out the high power loss components, it is possible to leave out the E-box fan and do away with the package problems arising in the E-box due to the small amount of space available. Moreover, as a consequence there is a reduction in the acoustic exposure drawn into the passenger compartment from the engine compartment and through the fan.

Thus it is especially advantageous if at least the vehicle's motor control unit is accommodated in the housing.

According to a further embodiment of the invention, the air supply and discharge line is in fluid connection with the motor vehicle's E-box so that the electrical and/or electronic components in the E-box can be cooled by means of the embodiment according to the invention. As a result, in a similar manner to the preceding embodiment, the fan of the E-box becomes superfluous whereby there is a cost saving and the ratio of installation space in the E-box is improved. Furthermore, the E-box is uncoupled acoustically from the passenger compartment so that no or a low level of noise is dragged in. Moreover, there is no longer any need for an extraction orifice that is connected to the passenger side footwell, which could be blocked by objects in the footwell or through which dust from the footwell can be sucked into the E-box, so that the danger of damaging the electrical and/or electronic components due to overheating or collecting dust can be reduced. Furthermore, it is possible in a simple manner to increase the cooling output in the E-box and accordingly to match it to requirements.

Advantageously in the combined cooling/climate control system of the present invention, a cooling unit is disposed upstream of the fan in the main ventilation duct. In other words, the climate control system of the present invention is an air conditioning system preferred in contemporary motor vehicles.

The air discharge pipe may be connected to the main ventilation duct upstream of the cooling unit in order to cool down the recirculated cooling air warmed up by the heat dissipated by the electrical and/or electronic components. Alternatively, however, it can also be connected to the main ventilation duct downstream of the cooling unit.

For appropriate control of the cooling air needed, which is taken from the main ventilation duct, a butterfly valve may be provided on or in the air supply pipe in the region of the joining point between the air supply pipe and the main ventilation duct, said butterfly valve being operable by means of a servomotor. By comparison with the prior art mentioned above, only one butterfly valve is necessary in the present invention whereas two are provided in the prior art.

Advantageously, at least one auxiliary ventilation duct is connected to the main ventilation duct downstream of the heating unit for air conditioning of the passenger compartment, said auxiliary ventilation duct leading into the passenger compartment. Advantageously, the supply of air to the auxiliary ventilation ducts and to corresponding connections with the passenger compartment is likewise controlled by way of butterfly valves, which are advantageously operated by means of a servomotor to enable appropriate control, which compensates for the cooling system's interference in the climate control system.

Further advantageous embodiments and features of the present invention stand alone and, as long as they do not contradict each other, may be inferred in any combinations of the following description of preferred embodiments of the present invention.

SHORT DESCRIPTION OF THE DRAWINGS

The present invention is described more accurately with reference to the accompanying drawings on the basis of purely exemplary preferred embodiments. The same reference numerals in the various views describe similar or the same elements in the drawings.

THE DRAWINGS SHOW

Figure 2:
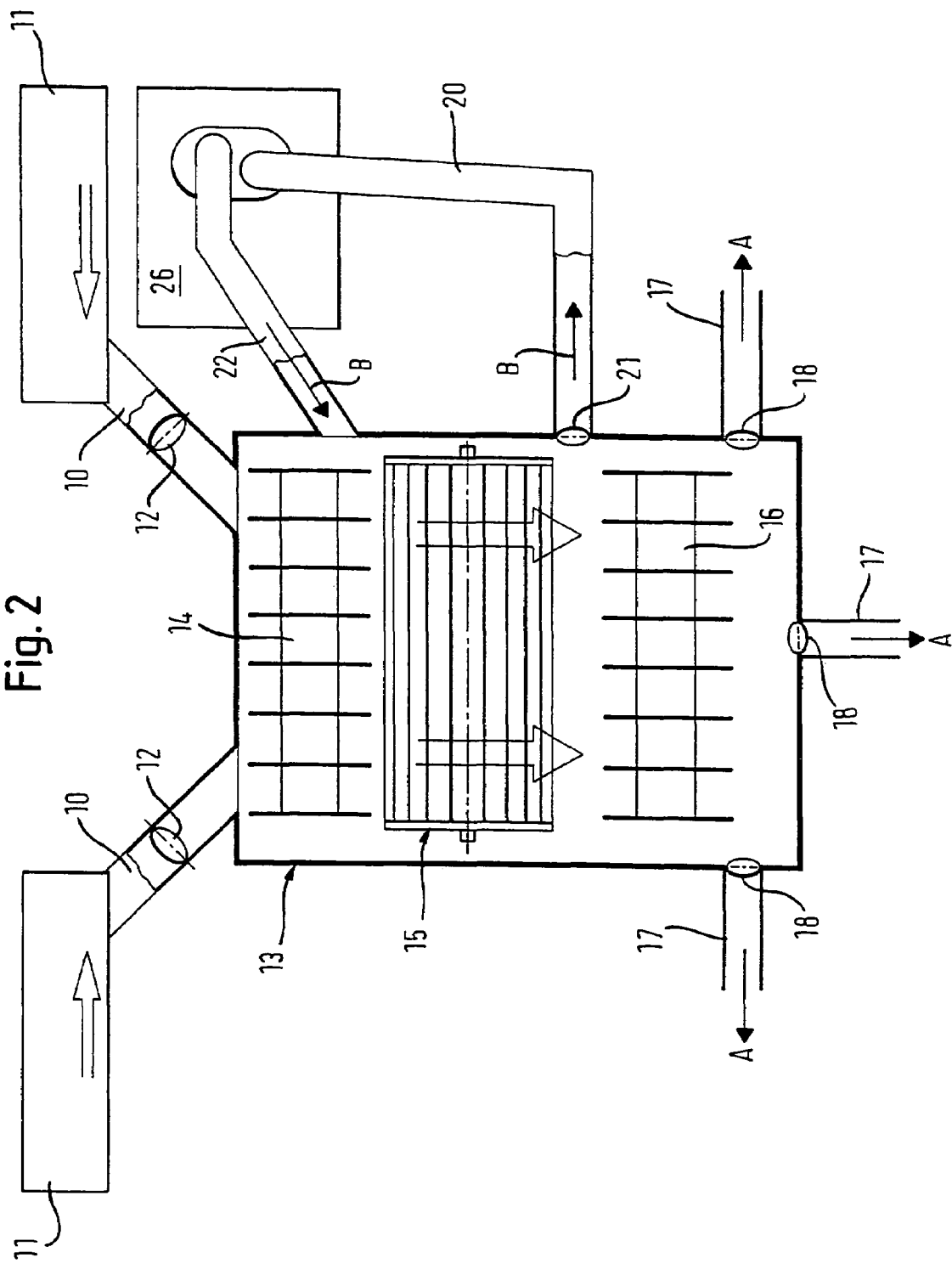
Figure 3:
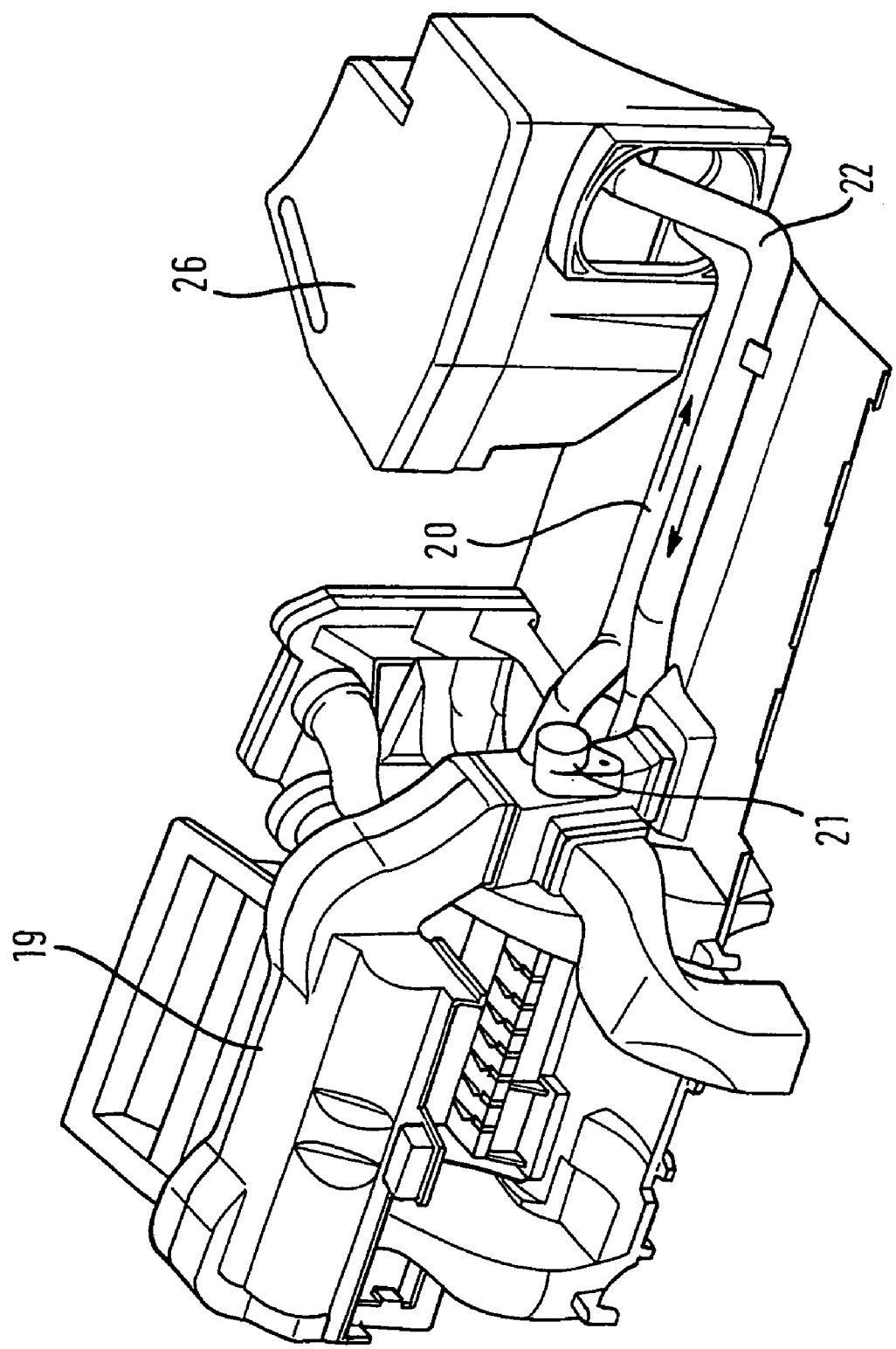

FIG. 1 a schematic view of a first exemplary embodiment of the present invention FIG. 2 a schematic view of a second exemplary embodiment of the present invention FIG. 3 a perspective view of the second exemplary embodiment of the present invention represented schematically in FIG. 2.

DESCRIPTION OF PREFERRED EMBODIMENTS

The present invention will be described purely by example in the following with reference to preferred embodiments, which are not to be considered as limiting the present invention.

FIG. 1 shows a schematic view of a first exemplary embodiment of the present invention. Thus an air conditioning system 19 (FIG. 3) of a motor vehicle is represented schematically in FIG. 1 as a climate control system. In the direction of air flow, the air conditioning system initially comprises two intake pipes 10, each of which may be preceded by an upstream pollen filter 11. In addition, recirculating valves 12 are provided in intake pipes 10 for the air conditioning system's air recirculation function. Intake pipes 10 lead to a main ventilation duct 13. In the exemplary embodiment of the air conditioning system as climate control system, a cooling unit 14, a fan 15 or a blower downstream of said cooling unit 14 and a heating unit 16 downstream of fan 15 are disposed in the main ventilation duct 13. Fan 15 may be a radial fan.

In the exemplary first embodiment shown, there are three auxiliary ventilation ducts 17 downstream of heating unit 16 and connected to main ventilation duct 13. A set of butterfly valves 18, which advantageously control the air flow into the respective auxiliary ventilation duct by way of servomotors, are disposed in auxiliary ventilation ducts 17 or at the joining point between auxiliary ventilation duct 17 and main ventilation duct 13.

According to the invention, in the exemplary first embodiment shown in FIG. 1, an air supply pipe 20 is connected with main ventilation duct 13 in such a way that the connection is made between fan 15 and heating unit 16, i.e. downstream of fan 15 in the direction of air flow. A further butterfly valve 21, which is likewise advantageously operable by way of a servomotor, is provided in air supply pipe 20 or at the joining point between main ventilation duct 13 and air supply pipe 20 in order to control the air flow into air supply pipe 20. In the exemplary embodiment shown, air supply pipe 20 is connected directly to an air discharge pipe 22 and is in fluid connection with said pipe. As a result, air supply pipe 20 and air discharge pipe 22 form a continuous duct. Air discharge pipe 22 is connected to main ventilation duct 13 upstream of fan 15 in the direction of flow of air drawn in through intake pipes 10.

The electrical and/or electronic components, which are to be cooled, are accommodated in a closed housing 24 which includes a heat exchanger 23. The heat exchanger may be designed in the form of ribs on the housing. Alternatively the heat exchanger may also be replaced by a Peltier element. Advantageously, in the embodiment shown, both the vehicle's motor control unit and also other control units with high power loss and control units for functional units of the passenger compartment, i.e. the vehicle interior, are provided in housing 24. These electrical and/or electronic components may be attached to corresponding connections by way of plug-in connector 25.

Heat exchanger 23 of housing 24 is disposed in the duct formed by air supply pipe 20 and air discharge pipe 22 to facilitate dissipation of the heat generated by the electrical and/or electronic components. As a result of this arrangement, the cooling air can flow through air supply pipe 20 past heat exchanger 23 into air discharge pipe 22 and at the same time dissipate the heat generated by the electrical and/or electronic components by way of heat exchanger 23.

The present invention's mode of operation is explained in the following purely by example on the basis of FIG. 1. To control the climate of the vehicle's passenger compartment, the driver or passenger in the vehicle selects an appropriate function or mode of operation of the air conditioning system. If the air conditioning system is in operation, fan 15 is activated and draws in air from outside through intake pipes 10, said air being filtered by pollen filters 11. In this case the recirculation valves facilitate an incoming supply of outside air through intake pipes 10, i.e. they are in an open position, or a recirculation function, i.e. they are in the closed position. The air drawn in is subsequently cooled by way of cooling unit 14 if cooling down of the passenger compartment is desired and correspondingly is heated by way of heating unit 16 if warming up of the passenger compartment is desired. Subsequently, the cooled or heated air is supplied to the passenger compartment by way of auxiliary ventilation ducts 17 or at least one of said ducts as shown by arrow A. If the air conditioning unit is not in operation, then in conventional systems fan 15 is stopped. However, as cooling of the electrical and/or electronic components in housing 24 must take place at all times, fan 15 is operated even with the climate control system stopped, i.e. the climate control system in an 'off' position, in order to produce a throughflow of air in duct 20, 22. Due to the connection positions of air supply pipe 20 and air discharge pipe 22 respectively upstream and downstream of the fan, a pressure difference arises between the two connections so that a flow of air through the fan is possible. By appropriate control of butterfly valves 18 for ventilation of the interior and of the fan power, it is possible to maintain air conditioning of the passenger compartment at a constant or substantially constant level so that the subjective perception of the passenger or passengers remains unaffected. In this case the driver does not select vent opening and fan power as previously, but rather selects a ventilation configuration. Thus, for example, the passenger or driver enters a desired interior temperature. Butterfly valve 21 is also correspondingly controlled by way of this actuation to facilitate optimum control and regulation of the system. The flow through duct 20, 22 is represented in FIG. 1 by arrow B.

Due to the embodiment of air supply and air discharge pipe 22 according to the invention, it becomes possible by appropriate regulation of butterfly valves 18 and of fan 15 and butterfly valve 21 to compensate for interference in the existing air conditioning or climate control system by the cooling system of the electrical and/or electronic components so that the passenger does not become aware of any change in the passenger compartment's air conditioning.

It is possible to achieve substantial advantages over previous cooling of the E-box if the components with high power loss, which are conventionally provided in the motor vehicle's E-box, are provided in housing 24 outside the E-box, whereby housing 24 is cooled as previously described, i.e. the waste heat of the components is dissipated by way of heat exchanger 23. Thus the E-box fan provided in the prior art can be dispensed with, which leads on one hand to cost savings and on the other to minimisation of the noise dragged into the passenger compartment by way of the fan and pipes connected with the passenger compartment. Furthermore, there is also no entrainment of dust from the passenger compartment through the pipe and the fan into the E-box so that it is possible to rule out any impairment of the components' ability to function due to the dust drawn in. In addition, there is also no danger that the intake orifice for cooling of the E-box provided in the passenger footwell in the prior art will be obstructed. Such obstruction meaning that adequate cooling cannot be ensured and the components will be damaged. This improves the reliability of cooling the high power loss components in the E-box, which are now provided in housing 24 according to the invention. Moreover, the problem of space in the E-box can also be remedied by moving the control units out of the E-box.

Moreover, if electrical and/or electronic components to be cooled, which were conventionally provided in an apparatus rack behind the dashboard and are connected to functional units of the passenger compartment, are provided in housing 24 then this also leads to the advantage of being able to dispense with the apparatus rack or replace it with more compact housing 24 so that more space exists behind the dashboard and the dashboard does not have to be adapted to suit said apparatus rack.

FIG. 2 shows a schematic diagram of a second exemplary embodiment as an alternative to the exemplary first embodiment, which is represented in FIG. 1. Parts and elements of the second exemplary embodiment, which are the same as those of the first exemplary embodiment shown in FIG. 1, are identified with the same reference numerals in FIG. 2. More detailed explanation of these parts and elements will be dispensed with at this point in order to avoid repetitions. In addition, reference will also be made to FIG. 3 when describing the second exemplary embodiment.

With reference to FIGS. 2 and 3, the second exemplary embodiment of the present invention differs from the first exemplary embodiment in that an air supply pipe 20 connects main ventilation duct 13 with an E-box 26 of the motor vehicle provided in the engine compartment. Thus, on one hand, air supply pipe 20 is connected downstream of fan 15 similarly to FIG. 1, and on the other it is connected to a cooling air inlet of E-box 26. In addition, air discharge pipe 22 connects E-box 26 with main ventilation duct 13. At the same time, air discharge pipe 22 is connected on one hand to a cooling air outlet of E-box 26 and on the other is connected, in a similar manner to the embodiment in FIG. 1, to main ventilation duct 13 upstream of fan 15. The supply of cooling air from main ventilation duct 13 is controlled or regulated by way of a butterfly valve 21, which is disposed in air supply pipe 20 or in the connecting area between main ventilation duct 13 and air supply pipe 20. Thus cooling air from main ventilation duct 13 is routed into E-box 26 by way of air supply pipe 20 and recirculated from E-box 26 to main ventilation duct 13 by way of air discharge pipe 22. Due to the connection positions according to the invention between air supply pipe 20 and main ventilation duct 13 and air discharge pipe 22 and main ventilation duct 13 respectively, a pressure difference is generated so that it is possible to create a flow of cooling air through E-box 26.

In other words, the E-box is connected to the air conditioning system by way of an air supply duct 20 and an air discharge duct 22. Butterfly valve 21 at the entrance to air supply duct 20 regulates the mass flow required for cooling of E-box 26. The air discharge duct opens into the air conditioning system's intake duct—in the direction of flow—downstream of the recirculation valve. As a result the mass flow, in a similar manner to the embodiment in FIG. 1, which is taken from the air conditioning system to cool E-box 26 or housing 24 in FIG. 1, is recirculated completely and the air conditioning system/interior system remains closed when recirculation valve 12 is closed. Fan 15 of the air conditioning system must always be activated to ensure cooling of E-box 26. Modification of the existing system—air conditioning system—can be completely or at least almost completely compensated by a slight increase in the fan power and appropriate control of butterfly valves 18 of the interior ventilation system.

For example, if a vehicle is decelerated to a standstill from an initial 100 km/h and the driver only wants airstream cooling, i.e. all air vents are open and the fan is switched off, then fan 15 is in operation for cooling E-box 26. However, in this case air supply valves 18 are not completely opened by way of the servomotors. With this valve position, the fan flow and the airstream add up to the driver's desired ventilation flow. During the deceleration phase, air supply valves 18 close by way of the servomotors and the fan power is reduced. Thus with this concept the driver does not select the valve opening and fan power but rather a ventilation configuration, which is fulfilled by appropriate control of the fan power and the valve position. As a result the subjective perception of the vehicle's passengers remains unaffected by the interference in the existing air conditioning unit.

The electronics monitor the temperature in E-box 26 in the control system of the combined cooling/climate control system represented in FIG. 2. In this case, for example, two temperature sensors, which are positioned in E-box 26, are evaluated. However, the use of one or more sensors is conceivable. For the control system, for example, two temperature thresholds are defined, that is to say for example $T_{MIN}=55°$ C. and $T_{MAX}=60°$ C. If the temperature in the E-box exceeds the threshold $T_{MAX}$, the valve control becomes active. Butterfly valve 21 is opened in stages (step by step, for example approximately 6%), as long as $T_{MAX}$ is not reached. Opening takes place with a cycle time of 30 seconds for example. The electronics of the cooling system take over control of the blower if the butterfly valve is opened and the climate control blower, i.e. fan 15, is switched off (blower level 0). In this case the blower is operated, for example, at level 1. If the driver selects a blower level greater than 0, control of fan 15 is immediately handed back to the air conditioning control unit. With a vehicle speed over 90 km/h an air outlet valve is opened in addition.

The valve position is not adjusted further if the temperature falls below the $T_{MAX}$ threshold. Butterfly valve 21 remains in the last position set. If blower control is taken over, it continues to be operated at level 1. Even in this temperature range the air outlet valve is opened if the vehicle is travelling faster than 90 km/h.

The butterfly valve is closed again if there is a drop below temperature threshold $T_{MIN}$. Blower control is handed back to the air conditioning control unit if necessary. In other words, when the blower is switched off (blower position 0), fan 15 is actuated on the basis of the E-box's cooling requirement. If the passenger or the driver of the vehicle desires air conditioning and operates the blower control, then regulation is taken over by the climate control system. This means that control of fan 15 is determined and actuated on the basis of the climatic conditions in the passenger compartment.

Furthermore, due to the development of the second exemplary embodiment according to the invention, the E-box fan becomes superfluous so that on one hand a cost saving is achieved and on the other it is also possible to do away with the problems connected with the fan that have already been described above. Moreover, additional construction space is saved by dispensing with the fan and the cooling potential is improved by comparison with the prior art. In addition, the cooling output can be matched to the respective control unit configuration and the heat generation in the E-box.

Thus the present invention proposes a system in both embodiments, which facilitates the cooling of electrical and/or electronic components whereby an existing climate control system of a motor vehicle is "tapped into" without affecting it in such a manner that the interference becomes noticeable for the vehicle's passenger. Furthermore, by arranging the high power loss electrical and/or electronic components in a housing cooled according to the invention or cooling of the E-box according to the invention, it is possible to improve on previous cooling of these elements, which are conventionally provided in the E-box.

The invention claimed is:

1. Combined cooling/climate control system for motor vehicles for cooling the motor vehicle's electrical components and electronic components and air conditioning of a passenger compartment of the vehicle, comprising:
    a main ventilation duct;
    a fan for drawing in air disposed in the main ventilation duct;
    a heating unit downstream of the fan for selective warming of air, which is to be supplied to the passenger compartment;
    a cooling unit disposed upstream of the fan in the main ventilation duct;
    a set of first butterfly valves for controlling an air flow into the passenger compartment;
    a closed housing for the electrical and/or electronic components connected by an air supply pipe downstream of the fan and upstream of the heating unit, the air supply pipe being connected to the main ventilation duct and by an air discharge pipe upstream of the cooling unit, the air discharge pipe being connected to the main ventilation duct;
    whereby the electrical and/or electronic components are cooled with air drawn in by the fan, and
    a second butterfly valve for controlling the air flow into the air supply pipe; and
    a control unit configured to control the set of first butterfly valves, the second butterfly valve and the fan power to compensate for interference in the air flow into the passenger compartment by the air flow into the air supply pipe so as to maintain air conditioning of the passenger compartment at a constant or substantially constant level.

2. Combined cooling/climate control system according to claim 1, in which the electrical and/or electronic components are disposed in a closed housing with a heat exchanger and the heat exchanger lies in a duct formed by the air supply pipe and air discharge pipe so that the waste heat of the electrical and/or electronic components can be dissipated by way of the heat exchanger.

3. Combined cooling/climate control system according to claim 2, in which at least one control unit of the motor vehicle's drive system and/or at least one control unit for another functional unit of the motor vehicle are accommodated in the housing.

4. Combined cooling/climate control system according to claim 3, in which at least the motor vehicle's engine control unit is accommodated in the housing.

5. Combined cooling/climate control system according to claim 1, in which the air supply pipe and the air discharge pipe are connected in fluid connection to a housing containing electrical and/or electronic components so that the electrical and/or electronic components can be cooled.

6. Combined cooling/climate control system according to claim 1, in which the second butterfly valve is provided on or in said air supply pipe in the region of the joining point between the air supply pipe and the main ventilation duct, said second butterfly valve being operable by way of a servomotor.

7. Combined cooling/climate control system according to claim 1, in which for air conditioning of the passenger compartment at least one auxiliary ventilation duct downstream of the heating unit is connected with main ventilation duct, which leads into said passenger compartment.

* * * * *